United States Patent
Lee (10) Patent No.: US 9,444,324 B2
(45) Date of Patent: Sep. 13, 2016

(54) SYNCHRONOUS DC-DC CONVERTER

(71) Applicant: HiDeep Inc, Seongnam-si, Gyeonggi-do (KR)

(72) Inventor: Wonwoo Lee, Seoul (KR)

(73) Assignee: HiDeep Inc., Gyeonggi-do (KR)

( * ) Notice: Subject to any disclaimer, the term of this patent is extended or adjusted under 35 U.S.C. 154(b) by 97 days.

(21) Appl. No.: 14/107,366

(22) Filed: Dec. 16, 2013

(65) Prior Publication Data

US 2014/0167722 A1 Jun. 19, 2014

(30) Foreign Application Priority Data

Dec. 17, 2012 (KR) ........................ 10-2012-0147271

(51) Int. Cl.
*H02M 3/156* (2006.01)
*H02M 1/38* (2007.01)
*H02M 3/158* (2006.01)

(52) U.S. Cl.
CPC ............. *H02M 1/38* (2013.01); *H02M 3/1588* (2013.01); *Y02B 70/1466* (2013.01)

(58) Field of Classification Search
CPC .... H02M 3/155; H02M 3/156; H02M 3/157; H02M 3/158; H02M 3/1588; H02M 3/1563; H02M 3/1584; H02M 3/33507
USPC ................................................ 323/282–289
See application file for complete search history.

(56) References Cited

U.S. PATENT DOCUMENTS

| 6,294,954 | B1 | 9/2001 | Melanson | |
|---|---|---|---|---|
| 7,986,135 | B2* | 7/2011 | Kenly et al. | 323/285 |
| 8,508,207 | B2* | 8/2013 | Burns et al. | 323/283 |
| 2010/0134083 | A1* | 6/2010 | Trescases | 323/283 |
| 2011/0221409 | A1* | 9/2011 | Nakamura et al. | 323/272 |
| 2012/0104852 | A1* | 5/2012 | Waltisperger et al. | 307/39 |

OTHER PUBLICATIONS

Office Action for KR No. 10-2012-0147271; issued Nov. 12, 2013; 4 pages.

* cited by examiner

*Primary Examiner* — Gary L Laxton
*Assistant Examiner* — Kevin H Sprenger
(74) *Attorney, Agent, or Firm* — Foley & Lardner LLP (57) ABSTRACT

Disclosed is a synchronous DC-DC converter including: a clock signal generator which generates a clock signal; a gate driving part which is connected to the clock signal generator and outputs a first delay clock signal and a second delay clock signal with respect to the clock signal; a switching part which is connected to the gate driving part and includes a first switching element and a second switching element which are complementarily switched according to each of the first delay clock signal and the second delay clock signal; and a controller which is connected to the switching part and generates a control signal which is usable by the gate driving part in order to control a dead time between the first switching element and the second switching element.

9 Claims, 5 Drawing Sheets

SYNCHRONOUS DC-DC CONVERTER

CROSS-REFERENCE TO RELATED APPLICATIONS

This application claims the benefit of Korean Patent Application No. 10-2012-0147271, filed on Dec. 17, 2012 the contents of which are hereby incorporated by reference in its entirety into the present disclosure.

BACKGROUND

1. Field

The present invention relates to a synchronous DC-DC converter, and more particularly to a synchronous DC-DC converter which improves power efficiency by optimizing a dead time.

2. Description of Related Art

Portable electronic devices such as a laptop computer, a personal digital assistant (PDA), and a smart phone are increasingly used every year. How much efficiency the portable electronic device achieves is an important factor in market competitiveness. This is because since the portable electronic device uses a battery as a voltage source, a time for use of the portable electronic device becomes longer with a higher efficiency. Therefore, research is being conducted to improve the efficiency of the portable electronic device.

In general, the portable electronic device uses a synchronous DC-DC converter. In the synchronous DC-DC converter, two switching elements are complementarily operated at a driving terminal Here, in order to reduce switching loss and stress generated in a case where the two switching elements are simultaneously in an on-state, when one switch becomes completely an off-state, the other switch should become the on-state. Accordingly, a dead time in which all of the two switches are in the off-state is caused.

Here, it is necessary to maintain the dead time to be optimal in order to enhance the power efficiency of the synchronous DC-DC converter.

SUMMARY

One embodiment is a synchronous DC-DC converter including: a clock signal generator which generates a clock signal; a gate driving part which is connected to the clock signal generator and outputs a first delay clock signal and a second delay clock signal with respect to the clock signal; a switching part which is connected to the gate driving part and includes a first switching element and a second switching element which are complementarily switched according to each of the first delay clock signal and the second delay clock signal; and a controller which is connected to the switching part and generates a control signal which is usable by the gate driving part in order to control a dead time between the first switching element and the second switching element.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, a rectification type DC-DC converter according to an embodiment of the present invention will be described with reference to accompanying drawings.

The rectification type DC-DC converter is a circuit or a device which converts a source of direct current (DC) from one voltage level to another. That is, when one level of a DC voltage is inputted to the DC-DC converter, another level of a DC voltage is outputted.

Hereafter, the following description will be provided by taking an example of a boost converter as the rectification type DC-DC converter which boosts an input DC voltage VIN into a voltage VOUT higher than the input DC voltage VIN.

Figure 1:
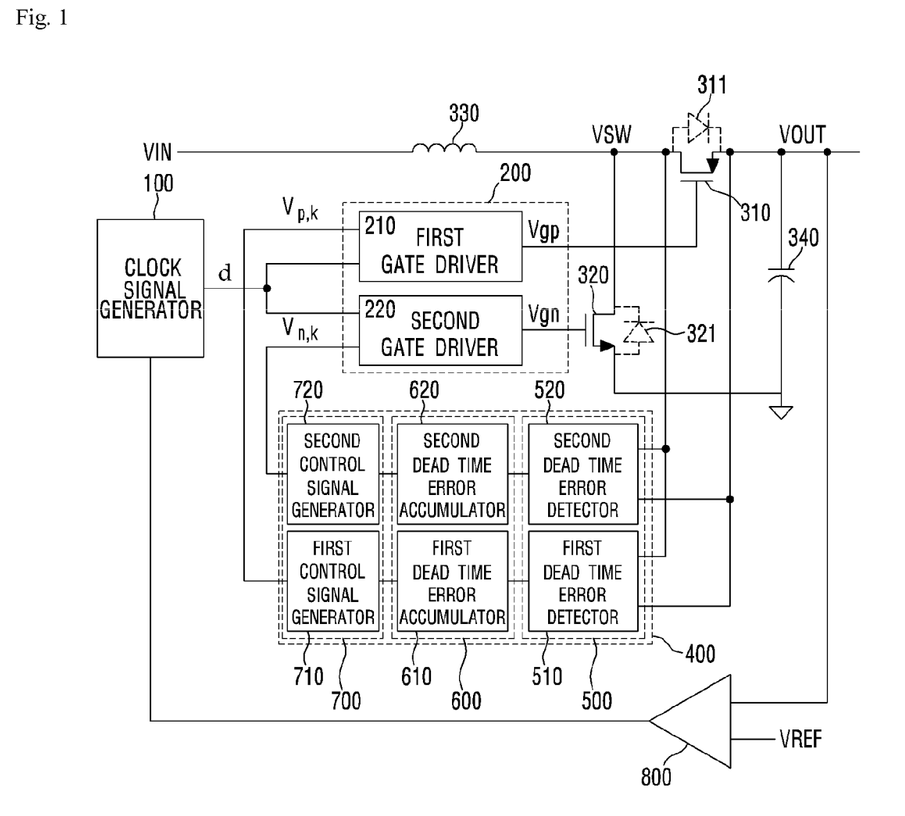
FIG. 1 shows an embodiment of a synchronous DC-DC converter according to an embodiment of the present invention.

FIG. 1 shows an embodiment of a synchronous DC-DC converter according to an embodiment of the present invention.

As shown in FIG. 1, the synchronous DC-DC converter according to the embodiment of the present invention includes a clock signal generator 100, a gate driving part 200, a switching part 310 and 320, and a controller 400.

Here, the switching parts 310 and 320 may include a first switching element 310 and a second switching element 320.

Here, the synchronous DC-DC converter according to the embodiment of the present invention may further include an inductor 330 and a capacitor 340. The inductor 330 is connected between an input DC voltage VIN and a coupling node VSW to which the first switching element 310 and the second switching element 320 are connected. The capacitor 340 is connected between one end of the first switching element 310 and a ground terminal.

In FIG. 1, a PMOS transistor and an NMOS transistor are taken as examples of the first switching element 310 and the second switching element 320, respectively. The first switching element 310 and the second switching element 320 become on and off respectively according to signals $V_{gp}$ and $V_{gn}$ applied to their control terminals, e. g, gate terminals of their own. Here, the first switching element 310 and the second switching element 320 should be on or off in an alternating manner, and only one switching element is allowed to be in the on-state at a time. Hereafter, it can be said that the first switching element 310 and the second switching element 320 are complementarily switched.

When the second switching element 320 is in the on-state, current flows clockwise through the inductor 330 and the inductor 330 stores energy. When the second switching element 320 is in the off-state and the first switching element 310 is in the on-state, the energy stored in the inductor 330 and the input DC voltage VIN charges the capacitor 340 through the first switching element 310.

Here, with a sufficiently high speed of the switching, the inductor 330 is not fully discharged when the capacitor 340 is charged. Accordingly, when the second switching element 320 is in the off-state and the first switching element 310 is in the on-state, an output voltage VOUT applied to a load (not shown) which is connected in parallel to the capacitor 340 is always higher than the input DC voltage VIN. As described above, when the second switching element 320 is in the off-state, the energy stored in the inductor and the input DC voltage VIN charge the capacitor 340. Subsequently, when the second switching element 320 is in the on-state and the first switching element 310 is in the off-state, the capacitor 340 is able to provide the stored voltage and energy to the load.

That is, when the second switching element 320 is in the off-state and the first switching element 310 is in the on-state, the output voltage VOUT is increased. When the second switching element 320 is in the on-state and the first switching element 310 is in the off-state, the output voltage VOUT is decreased.

A clock signal "d" is generated by the clock signal generator 100 for the purpose of controlling the on/off of the second switching element 320 in accordance with the desired output voltage VOUT. Here, the output voltage VOUT is detected and if the output voltage VOUT is lower than a desired reference value, a time for maintaining the electrical connection of the first switching element 310 is increased, and if the output voltage VOUT is higher than the desired reference value, the time for maintaining the electrical connection of the first switching element 310 is decreased. In the embodiment of the present invention, a pulse width modulation signal may be used as the clock signal.

For this, the synchronous DC-DC converter according to the embodiment of the present invention may further include a comparator 800, thereby controlling a duty ratio of the clock signal "d" outputted to the first switching element 310 and the second switching element 320 in accordance with a comparison result of the detected output voltage VOUT and the desired reference value. Accordingly, a constant voltage can be provided from the output voltage VOUT to the load.

When the first switching element 310 and the second switching element 320 enter the on-state at the same time, a short circuit occurs. Therefore, it is required to prevent shoot-through in which all of the two switching elements are simultaneously turned on. Accordingly, in order to prevent the two switching elements from being simultaneously turned on, a dead time is provided between the clock signal allowing one of the two switching elements to be turned off and the clock signal allowing the other to be turned on.

In the embodiment of the present invention, a time from a point of time when the first switching element 310 becomes the off-state to a point of time when the second switching element 320 becomes the on-state is designated as an on-dead time. Similarly to this, a time from a point of time when the second switching element 320 becomes the off-state to a point of time when the first switching element 310 becomes the on-state is designated as an off-dead time.

As shown in FIG. 1, the first switching element 310 and the second switching element 320 have own parasitic diodes 311 and 321 respectively. Before the second switching element 320 is turned on after the first switching element 310 is turned off, or before the first switching element 310 is turned on after the second switching element 320 is turned off, the parasitic diode 311 of the first switching element 310 may be turned on. Therefore, the parasitic diode 311 of the first switching element 310 is electrically conducted even for the dead time interval during which all of the first switching element 310 and the second switching element 320 are in the off-state, so that an additional voltage drop may occur. Thus, an operating efficiency of the synchronous DC-DC converter may be deteriorated and a battery life may be reduced. Accordingly, it is necessary to keep the dead time interval as short as possible, in other words, to optimize the dead time interval such that it is possible to prevent the shoot-through from occurring and to prevent the parasitic diode 311 of the first switching element 310 from being electrically conducted.

For the purpose of optimizing the dead time at the time of switching the first switching element 310 and the second switching element 320, the synchronous DC-DC converter according to the embodiment of the present invention includes the gate driving part 200 which is connected to the clock signal generator 100 and generates a first delay clock signal $V_{gp}$ and/or a second delay clock signal $V_{gn}$ which have been delayed by a predetermined amount of time.

Figure 2:
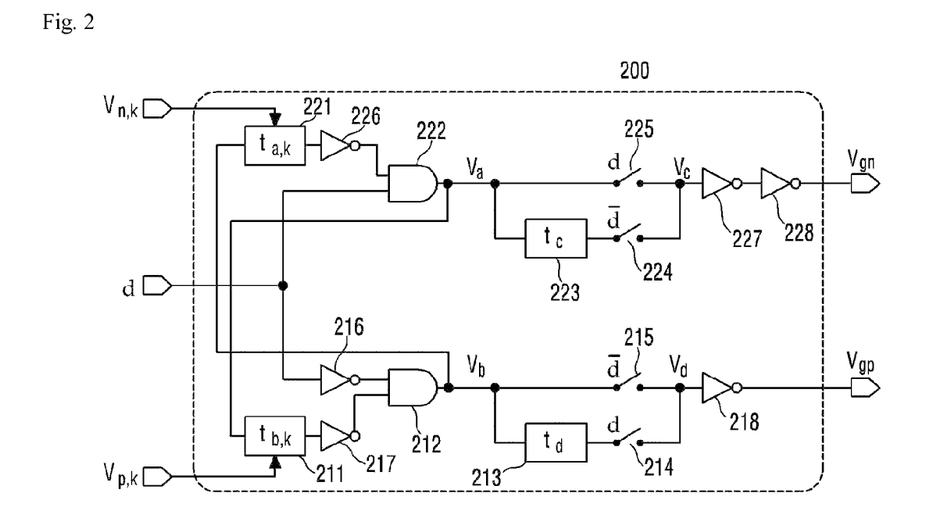
FIG. 2 shows an embodiment of a gate driving part shown in FIG. 1.

FIG. 2 shows an embodiment of the gate driving part 200 shown in FIG. 1. As shown in FIG. 1, according to the embodiment of the present invention, the gate driving part 200 may include a first gate driver 210 and a second gate driver 220. The first gate driver 210 is connected to the control terminal of the first switching element 310, that is, the gate terminal and may generate the first delay clock signal $V_{gp}$ for driving the first switching element 310. The second gate driver 220 is connected to the control terminal of the second switching element 320, that is, the gate terminal and may generate the second delay clock signal $V_{gn}$ for driving the second switching element 320.

The clock signal "d" generated by the clock signal generator 100 is inputted to the first gate driver 210 and the second gate driver 220. In addition to this, a control signal generated by the controller 400 is inputted to the gate driving part 200. Here, in order to optimize the dead time, the control signal includes information on how much the first delay clock signal $V_{gp}$ is delayed for the clock signal "d"

and/or on how much the second delay clock signal $V_{gn}$ is delayed for the clock signal "d".

In the embodiment of the present invention, an example is provided in which a first control signal $V_{p,k}$ is inputted to the first gate driver 210 so as to optimize the off-dead time and a second control signal $V_{p,k}$ is inputted to the second gate driver 220 so as to optimize the on-dead time.

For example, the first gate driver 210 may include a first adaptive delay unit 211 ($t_{b,k}$) for controlling the off-dead time in accordance with the first control signal $V_{p,k}$, a first AND gate 212, a first offset control unit 213 ($t_d$), and two switches 214 and 215 of which on/off is determined by the clock signal "d". Besides, the first gate driver 210 may include numbers of logic gates 216, 217 and 218.

Also, the second gate driver 220 may include a second adaptive delay unit 221 ($t_{a,k}$) for controlling the on-dead time in accordance with the second control signal $V_{n,k}$, a second AND gate 222, a second offset control unit 223 ($t_c$), and two switches 224 and 225 of which on/off is determined by the clock signal. Besides, the second gate driver 220 may include numbers of logic gates 226, 227 and 228.

Figure 3:
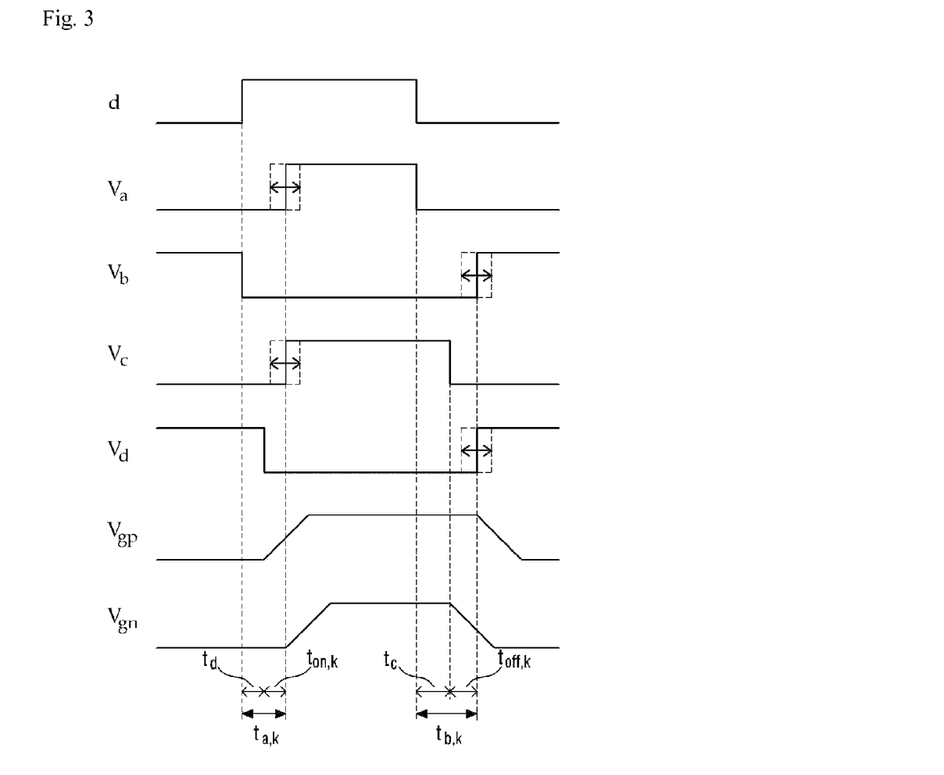
FIG. 3 shows an example showing an on-dead time and an off-dead time determined according to flow of signals by the gate driving part shown in FIG. 2.

FIG. 3 shows an example showing the on-dead time and the off-dead time determined according to flow of signals by the gate driving part 200 shown in FIG. 2.

As shown in FIG. 3, the clock signal "d" may be inputted to the gate driving part 200. Here, a rising edge of a signal at a Va node is delayed by $t_{a,k}$ than a rising edge of the clock signal "d". A signal at a Vb node has a shape obtained by inverting the shape of the clock signal "d" and has a rising edge which is delayed by $t_{b,k}$ than a falling edge of the clock signal "d". A signal at a Vc node is the same as the signal at the Va node. A falling edge of the signal at the Vc node is delayed by the offset $t_c$ than a falling edge of the signal at the Va node. A signal at a Vd node is the same as the signal at the Vb node. A falling edge of the signal at the Vd node is delayed by the offset $t_d$ than a falling edge of the signal at the Vb node. The offsets $t_c$ and $t_d$ are used in the embodiment of the present invention. However, this intends to assure the prevention of the shoot-through and may be omitted based on the embodiment. For example, the offsets $t_c$ and $t_d$ may be provided so as to prevent errors which may be caused by a very short time interval for detecting the dead time. In FIG. 3, it is indicated by horizontal arrows that the rising edges of the Va node to Vd node can be adaptively changed. This means that it is possible to adaptively change and control the dead time depending on the change of the load.

The first delay clock signal $V_{gp}$ has a shape obtained by inverting the shape of the signal at the Vd node. The PMOS transistor as the first switching element 310 is turned on by being applied a negative voltage. Therefore, in FIG. 3, when the first delay clock signal $V_{gp}$ is low, the first switching element 310 becomes the on-state, and when the first delay clock signal $V_{gp}$ is high, the first switching element 310 becomes the off-state. The second delay clock signal $V_{gn}$ has the same shape as that of the signal at the Vc node. When the second delay clock signal $V_{gn}$ is high, the second switching element 320 becomes the on-state, and when the second delay clock signal V is low, the second switching element 320 becomes the off-state. In FIG. 3, the rising edges and falling edges of the first delay clock signal $V_{gp}$ and the second delay clock signal $V_{gn}$ appear to be inclined. This intends to represent the reaction of a corresponding signal by a function of time. Generally, since the switching transistor (NMOS or PMOS transistor) is very large, a signal for driving the switching transistor has a certain inclination because a time is required for charging and discharging a parasitic capacitor of the switching transistor.

As shown in the bottom of the second delay clock signal $V_{gn}$ of FIG. 3, the off-dead time $t_{off,k}$, that is, a time from a point of time when the second switching element 320 is turned off to a point of time when the first switching element 310 is turned on may be determined by a difference between a delay magnitude of the first adaptive delay unit 211 and the offset $t_c$. In other words, $t_{off,k} = t_{b,k} - t_c$. The on-dead time $t_{on,k}$ that is, a time from a point of time when the first switching element 310 is turned off to a point of time when the second switching element 320 is turned on may be determined by a difference between a delay magnitude of the second adaptive delay unit 221 and the offset $t_d$. In other words, $t_{on,k} = t_{a,k} - t_d$.

As described above, the controller 400 generates the control signals $V_{p,k}$ and $V_{n,k}$ which are used for generating the first delay clock signal $V_{gp}$ and the second delay clock signal $V_{gn}$ for optimizing the on-dead time and the off-dead time. As shown in FIG. 1, the controller 400 according to the embodiment of the present invention may include a dead time error detector 500 detecting a dead time error at the switching of the first switching element 310 and the second switching element 320, a dead time error accumulator 600 accumulating the detected dead time errors, and a control signal generator 700 generating the control signal in accordance with an output signal of the dead time error accumulator 600.

FIG. 1 and the following description show a configuration for generating the second control signal $V_{n,k}$ for optimizing the on-dead time includes a second dead time error detector 520, a second dead time error accumulator 620, and a second control signal generator 720, aside from a configuration for generating the first control signal $V_{p,k}$ for optimizing the off-dead time includes a first dead time error detector 510, a first dead time error accumulator 610, and a first control signal generator 710. However, this is only an example. The controller 400 according to the embodiment of the present invention may include the dead time error detector, the dead time error accumulator, and the control signal generator in common with respect to the on-dead time and the off-dead time.

Figure 4:
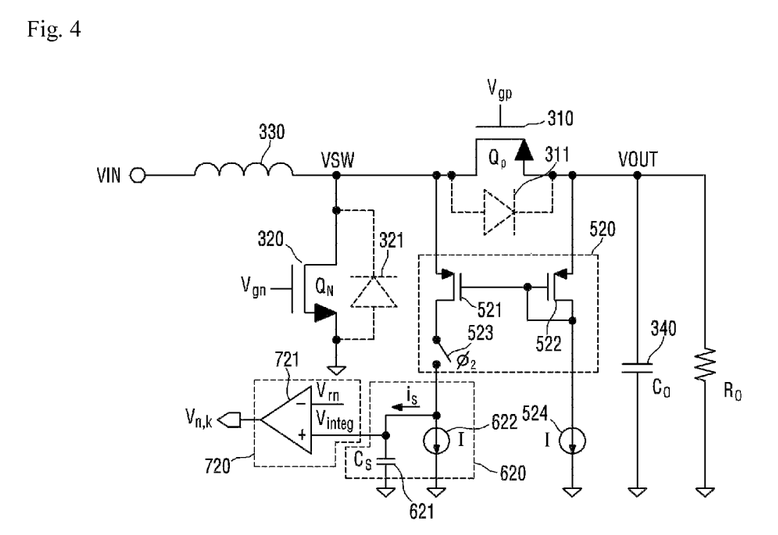
FIG. 4 shows an embodiment of a controller of the synchronous DC-DC converter shown in FIG. 1.

FIG. 4 shows an embodiment of the controller 400 of the synchronous DC-DC converter shown in FIG. 1. The controller 400 shown in FIG. 4 includes the second dead time error detector 520 which detects an on-dead time error and generates the second control signal $V_{n,k}$, the second dead time error accumulator 620, and the second control signal generator 720.

The dead time error detector 500 according to the embodiment of the present invention, together with the second dead time error detector 520, senses and detects the dead time error by using a voltage difference between a drain and a source of the first switching element 310. For instance, the dead time error detector 500 according to the embodiment of the present invention can detect the dead time error by means of current caused by the voltage difference between the drain and the source of the first switching element 310.

The second dead time error detector 520 according to the embodiment of the present invention may include a current mirror including a first transistor 521 and a second transistor 522 whose control terminals are connected to each other and whose one ends are connected to the drain and the source of the first switching element 310 respectively. The current mirror can detect the dead time error by using a voltage difference between a drain and a source of the transistor. In FIG. 4, an MOS transistor is taken as an example of the first transistor 521 and the second transistor 522. Also, the second dead time error detector 520 may further include a switch "ø2" 523 connected between the second dead time error accumulator 620 and the other end of the first transistor 521.

The switch "ø2" 523 transmits current "$i_s$" caused by the voltage difference between the drain and the source of the first switching element 310 to the second dead time error accumulator 620 only during the dead time interval.

Figure 5:
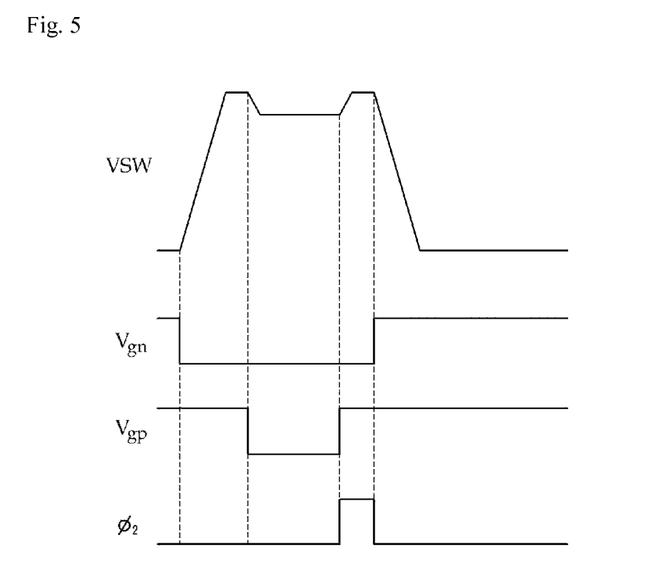
FIG. 5 shows an example of an on/off interval of a switch used in the controller shown in FIG. 4.

FIG. 5 shows an example of an on/off interval of the switch "ø2" 523 used in the controller 400 shown in FIG. 4. That is, it can be seen that the switch "ø2" 523 is in the on-state only during a period of time from the rising edge of the first delay clock signal denoted by $V_{gp}$ to the rising edge of the second delay clock signal denoted by $V_{gn}$. In other words, the switch "ø2" 523 is in the on-state during a time from a point of time when the first switching element 310 is turned off to a point of time when the second switching element 320 is turned on, that is, during the on-dead time, and the switch "ø2" 523 can transmit the current "$i_s$" to the second dead time error accumulator 620. A waveform of a signal at the coupling node VSW is shown in the uppermost part of FIG. 5. The waveform of the signal at the coupling node VSW corresponds to the first delay clock signal $V_{gp}$ and the second delay clock signal $V_{gn}$ shown in FIG. 5. Here, the coupling node VSW refers to a node to which the first switching element 310 and the second switching element 320 are connected.

Although not shown in the drawing, the switch "ø2" 523 may receive a clock signal indicating the on-dead time interval from the gate driving part 200 and the like.

As shown in FIG. 4, the second dead time error detector 520 according to the embodiment of the present invention may include a reference current source "I" 524 between the ground terminal and the other end of the second transistor 522. The reference current source "I" 524 as a bias current of the current mirrors 521 and 522 functions to constantly sink the current.

Also, the second dead time error accumulator 620 according to the embodiment of the present includes a capacitor 621 which receives the current "$i_s$" from the second dead time error detector 520 and accumulates the voltage. During a time when the switch "ø2" 523 is in the on-state, the current "$i_s$" from the second dead time error detector 520 causes electric charges to be accumulated in the capacitor 621, thereby increasing the voltage of the capacitor 621. Here, the second dead time error accumulator 620 may include a discharging current source 622 which is connected in parallel between the capacitor 621 and the ground terminal During a time when the switch "ø2" 523 is in the off-state, the electric charges accumulated in the capacitor 621 may be discharged through the current source 622. Here, as with the reference current source 524, the current source 622 as the bias current of the current mirrors 521 and 522 functions to constantly sink the current. Also, the magnitude "I" of the current source 622 may be the same as the magnitude "I" of the reference current source 524. If the dead time interval is greater than a normal interval, the current "$i_s$" is greater than the magnitude "I" of the current source 622, so that the accumulated voltage "Vinteg" is increased. If the dead time interval is less than a normal interval, the current "$i_s$" is smaller than the magnitude "I" of the current source 622, so that the accumulated voltage "Vinteg" is decreased. Accordingly, electric charges may be newly started to be accumulated in the capacitor 621 from the current "$i_s$" during a new switching cycle.

As shown in FIG. 5, the voltage at the coupling node VSW when the first switching element 310 is in the on-state is higher than the voltage at the coupling node VSW when the second switching element 320 is in the on-state. Here, the parasitic diode 311 of the first switching element is electrically conducted during the on-dead time interval, i.e., during a time interval when the switch "ø2" 523 is in the on-state, so that reverse current flows through the first switching element 310. When the parasitic diode 311 becomes the on-state, the voltage at the coupling node VSW during the on-dead time interval is higher than the voltage at the coupling node VSW when the first switching element 310 is in the on-state. This is shown in FIG. 5. That is, the waveform of the voltage at the coupling node VSW becomes greater during the on-dead time prior to the falling edge. Here, a difference between the voltage at the coupling node VSW at a point of time when the parasitic diode 311 becomes the on-state and the voltage at the coupling node VSW during the time interval when the first switching element 310 is in the on-state may be represented by a voltage difference between the source and the drain of the first switching element 310. Therefore, in the embodiment of the present invention, the dead time error can be detected by detecting the voltage between the source and the drain of the first switching element 310.

Figure 6:
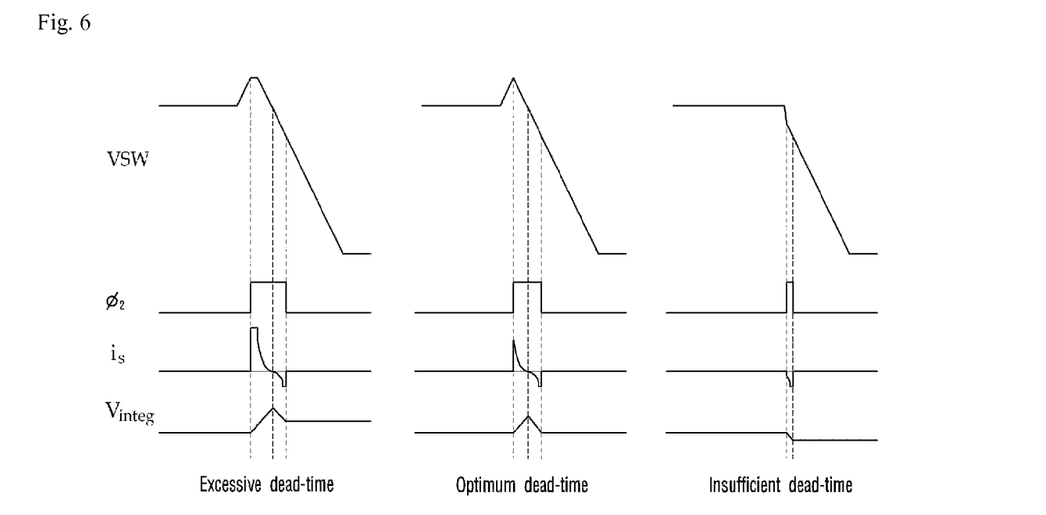
FIG. 6 shows an example of magnitude change of current "$i_s$" which is transmitted to a capacitor shown in FIG. 4 and of magnitude change of a voltage "Vinteg" which is accumulated in the capacitor in accordance with a duration time of the on-dead time.

FIG. 6 shows an example of magnitude change of the current "$i_s$" which is transmitted to the capacitor 621 shown in FIG. 4 and of magnitude change of voltage "Vinteg" which is accumulated in the capacitor 621 in accordance with a duration time of the on-dead time.

FIG. 6 shows waveforms of the voltage and the current "$i_s$" at the coupling node VSW, and the voltage "Vinteg" which is accumulated in the capacitor 621 when the on-dead time is an optimum on-dead time. That is, when the on-dead time is optimized and not equal to 0 in order to prevent the shoot-through from occurring at the time of switching the first switching element 310 and the second switching element 320, the voltage "Vinteg" which is accumulated in the capacitor 621 in accordance with the current "$i_s$" may be the same as the voltage before the accumulation.

A case where the on-dead time is excessively long is shown to the left of the FIG. 6. In this case, compared with the case of the optimum on-dead time, a time during which the parasitic diode 311 of the first switching element 310 is electrically conducted at the coupling node VSW is increased. Consequently, the voltage "Vinteg" which is accumulated in the capacitor 621 in accordance with the current "$i_s$" may be higher than the voltage before the accumulation.

Contrarily, a case where the on-dead time is not sufficient is shown to the right of the FIG. 6. In this case, compared with the case of the optimum on-dead time, the voltage increase at the coupling node VSW by the electrical conduction of the parasitic diode 311 of the first switching element 310 is not observed before the falling edge occurs. In this case, due to the very short on-dead time interval, there is a possibility of occurrence of the shoot-through. In this case, the voltage "Vinteg" which is accumulated in the capacitor 621 in accordance with the current "$i_s$" may be less than the voltage before the accumulation.

As shown in FIG. 4, the second control signal generator 720 of the present invention may include a comparator 721 which compares the output signal "Vinteg" of the second dead time error accumulator 620 with a predetermined reference signal "Vrn" showing optimum dead time information, and generates the second control signal $V_{n,k}$. Here, the output signal from the second dead time error accumulator 620 may be the voltage accumulated in the capacitor 621. Also, the predetermined reference signal "Vrn" may be set to a value of voltage which should be accumulated in the capacitor 621 when the on-dead time is an optimum on-dead time.

Figure 7:
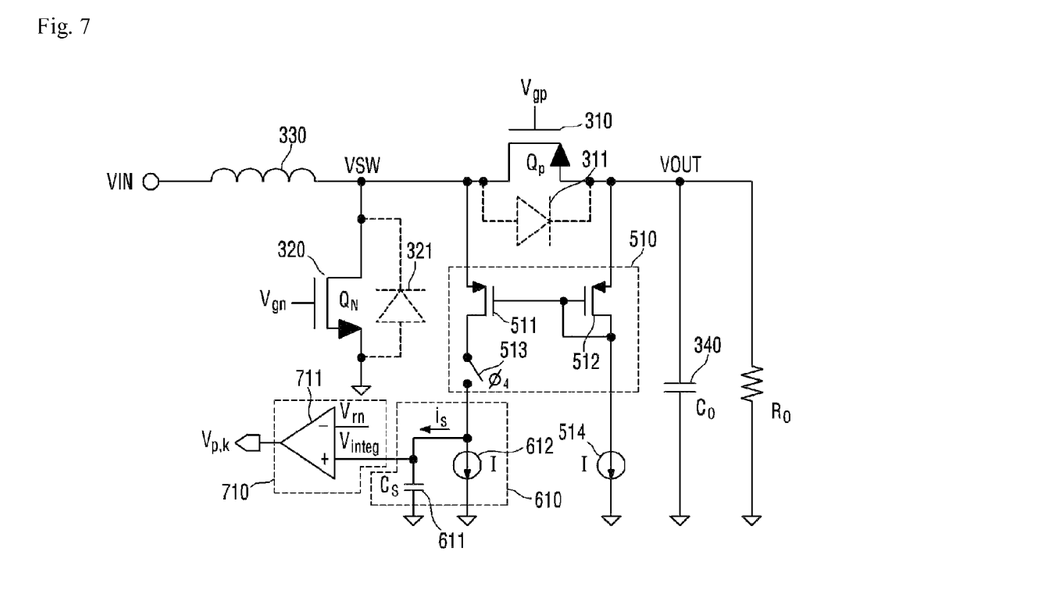
FIG. 7 shows another embodiment of the controller of the synchronous DC-DC converter shown in FIG. 1.

FIG. 7 shows another embodiment of the controller 400 of the synchronous DC-DC converter shown in FIG. 1. The controller 400 shown in FIG. 7 includes the first dead time error detector 510 which detects the off-dead time error and generates the first control signal $V_{p,k}$, the first dead time error accumulator 610, and the first control signal generator 710.

The first dead time error detector 510, the first dead time error accumulator 610, and the first control signal generator 710 shown in FIG. 7 are the same as the second dead time error detector 520, the second dead time error accumulator 620, and the second control signal generator 720 shown in FIG. 4. However, a difference is that the first control signal $V_{p,k}$ for optimizing the off-dead time is generated. Therefore, repetitive descriptions will be omitted hereafter.

The first dead time error detector 510 shown in FIG. 7 may include a switch "ø4" 513 connected between the first transistor 521 and the first dead time error accumulator 610. The switch "ø4" 513 transmits the current "$i_s$" caused by the voltage difference between the drain and the source of the first switching element 310 to the first dead time error accumulator 610 only during the dead time interval.

Figure 8:
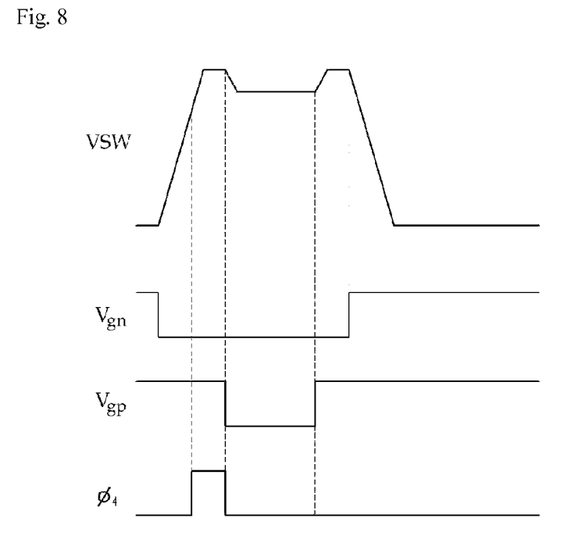
FIG. 8 shows an example of an on/off interval of a switch used in the controller shown in FIG. 7.

FIG. 8 shows an example of an on/off interval of a switch "ø4" 513 used in the controller 400 shown in FIG. 7. That is, the switch "ø4" 513 is in the on-state only during a period of time from the falling edge of the second delay clock signal denoted by $V_{gn}$ to the falling edge of the first delay clock signal denoted by $V_{gp}$. However, FIG. 8 shows that there is an offset delay between the rising edge of the switch "ø4" 513 and the falling edge of the second delay clock signal. The offset delay can be, as described above, inserted or removed according to the embodiment. The switch "ø4" 513 is in the on-state during a time from a point of time when the second switching element 320 is turned off to a point of time when the first switching element 310 is turned on, that is, during the off-dead time, and the switch "ø4" 513 can transmit the current "$i_s$" to the first dead time error accumulator 610. As with the switch "ø2" 523 shown in FIG. 4, the switch "ø4" 513 may also receive a necessary clock signal from the gate driving part 200 and the like.

Figure 9:
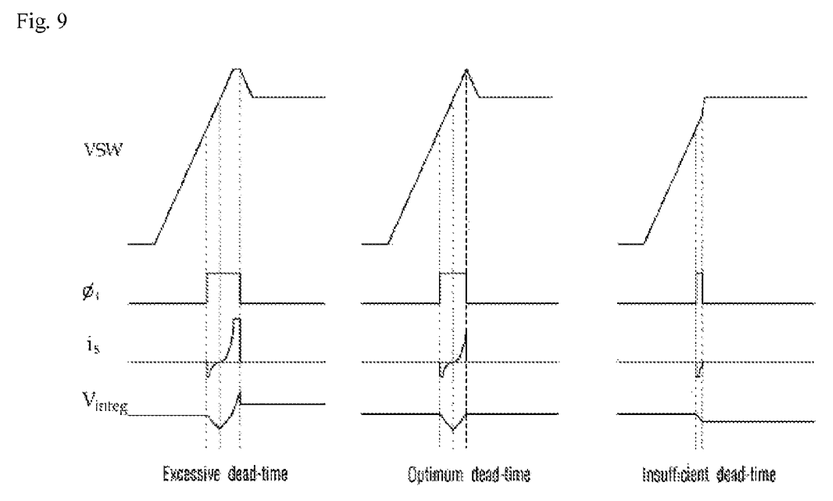
FIG. 9 shows an example of magnitude change of current "$i_s$" which is transmitted to a capacitor shown in FIG. 7 and of magnitude change of a voltage "Vinteg" which is accumulated in the capacitor in accordance with a duration time of the off-dead time.

FIG. 9 shows an example of magnitude change of current "$i_s$" which is transmitted to a capacitor 611 shown in FIG. 7 and of magnitude change of the voltage "Vinteg" which is accumulated in the capacitor 611 in accordance with a duration time of the off-dead time.

FIG. 9 shows waveforms of the voltage and the current "$i_s$" at the coupling node VSW, and the voltage "Vinteg" which is accumulated in the capacitor 611 when the off-dead time is an optimum off-dead time. That is, when the off-dead time is optimized and not equal to 0 in order to prevent the shoot-through from occurring at the time of switching the first switching element 310 and the second switching element 320, the voltage "Vinteg" which is accumulated in the capacitor 611 in accordance with the current "$i_s$" may be the same as the voltage before the accumulation.

A case where the off-dead time is excessively long is shown to the left of the FIG. 9. In this case, compared with the case of the optimum off-dead time, a time during which the parasitic diode 311 of the first switching element 310 is electrically conducted at the coupling node VSW is increased. Consequently, the voltage "Vinteg" which is accumulated in the capacitor 611 in accordance with the current "$i_s$" may be higher than the voltage before the accumulation.

Contrarily, a case where the off-dead time is not sufficient is shown to the right of the FIG. 9. In this case, compared with the case of the optimum off-dead time, the voltage increase at the coupling node VSW by the electrical conduction of the parasitic diode 311 of the first switching element 310 is not observed at the rising edge. In this case, due to the very short off-dead time interval, there is a possibility of occurrence of the shoot-through. Here, the voltage "Vinteg" which is accumulated in the capacitor 611 in accordance with the current "$i_s$" may be less than the voltage before the accumulation.

As shown in FIG. 7, the first control signal generator 710 of the present invention may include a comparator 711 which compares the output signal "Vinteg" of the first dead time error accumulator 610 with a predetermined reference signal "Vrn" showing optimum dead time information, and generates the first control signal $V_{p,k}$. Here, the output signal from the first dead time error accumulator 610 may be the voltage accumulated in the capacitor 611. Also, the predetermined reference signal "Vrn" may be set to a value of voltage which should be accumulated in the capacitor 611 when the off-dead time is an optimum off-dead time.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:
1. A synchronous DC-DC converter comprising:
a clock signal generator which generates a first clock signal;
a gate driving part which is connected to the clock signal generator and outputs a first delay clock signal and a second delay clock signal with respect to the first clock signal generated by the clock signal generator;
a switching part which is connected to the gate driving part and includes a first switching element and a second switching element which are complementarily switched according to each of the first delay clock signal and the second delay clock signal; and
a controller which is connected to the switching part and configured to detect a dead time error by using a voltage difference between terminals of the switching part and generate, based the detected dead time error, a control signal which is usable by the gate driving part in order to control a dead time between the first switching element and the second switching element;
a dead time error detector detecting the dead time error;
a dead time error accumulator accumulating the detected dead time error; and a control signal generator generating the control signal in accordance with an output signal of the dead time error accumulator, wherein the first delay clock signal and the second delay clock signal are applied to a gate of the first switching element and a gate of the second switching element respectively, wherein a drain of the first switching element and a drain of the second switching element are connected to each other at a coupling node, wherein the dead time error detector detects a voltage difference between the drain and a source of the first switching element and transmits current caused by the voltage difference to the dead time error accumulator during the dead time, wherein the dead time error detector corn arises a current mirror including a first transistor and a second transistor whose control terminals are connected to each other and whose one ends are connected to the drain and the source of the first switching element respectively, wherein a switch for transmitting the current to the dead time error accumulator only during the dead time is connected between the dead time error accumulator and the other end of the first transistor, and wherein a reference current source is connected between a ground terminal and the other end of the second transistor.

2. The synchronous DC-DC converter of claim 1, wherein the dead time error accumulator comprises a capacitor which receives the current from the dead time error detector and accumulates voltage, and wherein the output signal from the dead time error accumulator includes magnitude information of the voltage accumulated in the capacitor.

3. The synchronous DC-DC converter of claim 1, wherein the dead time error accumulator comprises a capacitor which receives the current from the dead time error detector and accumulates voltage, and comprises a discharging current source which is in parallel with the capacitor and is connected between the dead time error detector and the ground terminal, wherein, when the switch is off, the capacitor is discharged through the discharging current source, and wherein the output signal from the dead time error accumulator includes magnitude information of the voltage accumulated in the capacitor.

4. The synchronous DC-DC converter of claim 2, wherein the control signal generator comprises a comparator which compares the output signal with a predetermined reference signal showing optimum dead time information, and generates the control signal.

5. The synchronous DC-DC converter of claim 1, wherein the gate driving part comprises a first gate driver generating the first delay clock signal, and a second gate driver generating the second delay clock signal, wherein, when the dead time is an off-dead time, the control signal is inputted to the first gate driver and is used for generating the first delay clock signal, and wherein, when the dead time is an on-dead time, the control signal is inputted to the second gate driver and is used for generating the second delay clock signal.

6. The synchronous DC-DC converter of claim 1, wherein the controller is connected between terminals of the first switching element.

7. The synchronous DC-DC converter of claim 6, wherein the controller is connected between a drain and a source of the first switching element.

8. The synchronous DC-DC converter of claim 1, wherein the controller is configured to receive input signals from terminals of the first switching element and generate, as an output signal, the control signal which is usable by the gate driving part.

9. The synchronous DC-DC converter of claim 8, wherein the controller is configured to receive the input signals from a drain and a source of the first switching element.

* * * * *